United States Patent

Ito et al.

[11] Patent Number: 5,726,109
[45] Date of Patent: Mar. 10, 1998

[54] DEEP GRAY COLORED GLASS

[75] Inventors: Mizuki Ito; Takashi Kijima, both of Yokohama, Japan

[73] Assignee: Asahi Glass Company Ltd., Tokyo, Japan

[21] Appl. No.: 538,633

[22] Filed: Oct. 4, 1995

[30] Foreign Application Priority Data

Oct. 5, 1994 [JP] Japan ................. 6-241579

[51] Int. Cl.$^6$ ................. C03C 3/87
[52] U.S. Cl. ................. 501/71
[58] Field of Search ................. 501/71

[56] References Cited

U.S. PATENT DOCUMENTS

| | | | |
|---|---|---|---|
| Re. 25,312 | 1/1963 | Duncan et al. | 501/71 |
| 3,723,142 | 3/1973 | Kato et al. | 501/71 |
| 4,104,076 | 8/1978 | Pons | 501/71 |
| 4,792,536 | 12/1988 | Pecoraro et al. | 501/70 |
| 4,866,010 | 9/1989 | Boulos et al. | 501/71 |
| 4,873,206 | 10/1989 | Jones | 501/71 |
| 5,023,210 | 6/1991 | Krumwiede et al. | 501/71 |
| 5,278,108 | 1/1994 | Cheng et al. | 501/71 |
| 5,308,805 | 5/1994 | Baker et al. | 501/71 |
| 5,346,867 | 9/1994 | Jones et al. | 501/71 |
| 5,352,640 | 10/1994 | Combes et al. | 501/71 |
| 5,411,922 | 5/1995 | Jones | 501/71 |
| 5,545,596 | 8/1996 | Alvarez-Casariego et al. | 501/71 |

FOREIGN PATENT DOCUMENTS

| | | |
|---|---|---|
| 0 482 535 | 4/1992 | European Pat. Off. . |
| 2082647 | 12/1971 | France ................. 501/71 |
| 2-64038 | 3/1990 | Japan . |
| 4-275943 | 10/1992 | Japan . |
| WO 95/18075 | 7/1995 | WIPO . |

OTHER PUBLICATIONS

Database WPI, Derwent Publications, AN-94-321988, JP-A-06-247740, Sep. 6, 1994.

*Primary Examiner*—Mark L. Bell
*Assistant Examiner*—Louis M. Troilo
*Attorney, Agent, or Firm*—Oblon, Spivak, McClelland, Maier & Neustadt, P.C.

[57] ABSTRACT

A deep gray colored glass comprising 100 parts by weight of matrix components and coloring components consisting essentially of: from 0.8 to 1.4 parts by weight of total iron calculated as $Fe_2O_3$, at most 0.21 part by weight of FeO, from 0.05 to 1.0 part by weight of $TiO_2$, from 0.0005 to 0.015 part by weight of Se and from 0.02 to 0.05 part by weight of CoO, wherein the matrix components comprise from 65 to 75 wt % of $SiO_2$, from 0.1 to 5.0 wt % of $Al_2O_3$, from 10 to 18 wt % of $Na_2O+K_2O$, from 5 to 15 wt % of CaO, from 1 to 6 wt % of MgO and from 0.05 to 1.0 wt % of $SO_3$.

9 Claims, No Drawings

DEEP GRAY COLORED GLASS

The present invention relates to a deep gray colored glass having low visible light transmittance, low ultraviolet ray transmittance and low solar radiation transmittance, which is suitable as a rear window glass for an automobile.

A typical neutral gray colored heat absorbing glass containing $Fe_2O_3$, Se, CoO, NiO, $Cr_2O_3$, etc., is known. However, a glass of this type has high solar radiation transmittance and contains nickel.

Nickel is not desirable, since it sometimes forms nickel sulfide in glass. Nickel sulfide is almost indistinguishable by naked eyes and presents no adverse effects to glass in a usual state. However, it has a large thermal expansion coefficient and thus sometimes causes a thermal stress sufficient to break the glass containing such nickel sulfide e.g. when the glass is subjected to quenching for toughening.

Gray glasses containing no nickel are disclosed in Japanese Unexamined Patent Publications No. 64038/1990 and No. 275943/1992. The former has a problem that the solar radiation transmittance is high. In the latter case, it is a condition for the production of the glass to form an appropriate redox condition for coloring the glass, and for that purpose, it is necessary to provide a special type of structure in the refining step, thus leading to a problem that the process is rather restricted.

Further, U.S. Pat. No. 5,411,922 discloses a glass composition containing no nickel nor chromium. This composition contains a relatively large amount of FeO. However, no specific example of the composition is disclosed.

It is an object of the present invention to solve the above problems of the prior art and to provide a glass which is readily meltable and can be produced by a conventional float glass production process and which exhibits a deep gray color with the visible light transmittance controlled to be as low as possible, and with the solar radiation transmittance and ultraviolet ray transmittance lowered substantially.

The present invention provides a deep gray colored glass comprising 100 parts by weight of matrix components and coloring components consisting essentially of: from 0.8 to 1.4 parts by weight of total iron calculated as $Fe_2O_3$, at most 0.21 part by weight of FeO, from 0.05 to 1.0 part by weight of $TiO_2$, from 0.0005 to 0.015 part by weight of Se and from 0.02 to 0.05 part by weight of CoO, wherein the matrix components comprise from 65 to 75 wt % of $SiO_2$, from 0.1 to 5.0 wt % of $Al_2O_3$, from 10 to 18 wt % of $Na_2O+K_2O$, from 5 to 15 wt % of CaO, from 1 to 6 wt % of MgO and from 0.05 to 1.0 wt % of $SO_3$.

The reasons for defining the above components will be described.

Firstly, with respect to the matrix components, if the content of $SiO_2$ is less than 65 wt %, the weather resistance tends to be poor, and if it exceeds 75 wt %, the glass tends to be devitrified. If the content of $Al_2O_3$ is less than 0.1 wt %, the water resistance tends to be low, and if it exceeds 5 wt %, the meltability in the furnace tends to be low.

$Na_2O$ and $K_2O$ are components which promote melting of the batch. If the total amount of the two is less than 10 wt %, such an effect tends to be low, and if it exceeds 18 wt %, the weather resistance tends to be poor.

CaO and MgO are components which promote dissolution of the batch and which improve the weather resistance. If the content of CaO is less than 5 wt %, such effects tend to be low, and if it exceeds 15 wt %, the glass tends to be devitrified. If the content of MgO is less than 1 wt %, the above effects tend to be low, and if it exceeds 6 wt %, the glass tends to be devitrified.

$SO_3$ is a refining component. If the content of $SO_3$ is less than 0.05 wt %, the refining effect tends to be little, and if it exceeds 1.0 wt %, the $SO_2$ gas tends to remain as bubbles in the glass.

To 100 parts by weight of the above described matrix components, the glass contains from 0.8 to 1.4 parts by weight of total iron calculated as $Fe_2O_3$, at most 0.21 part by weight of FeO, from 0.05 to 1.0 part by weight of $TiO_2$, from 0.0005 to 0.015 part by weight of Se and from 0.02 to 0.05 part by weight of CoO.

If the content of total iron calculated as $Fe_2O_3$ is less than 0.8 part by weight, the visible ray transmittance tends to be too high, and if it exceeds 1.4 parts by weight, the radiation heat during melting will be shielded, and the heat tends to hardly reach the deeper part of the glass melt, whereby melting tends to be difficult.

The content of ferrous (bivalent) iron calculated as $Fe_2O_3$ is preferably from 10 to 30%, more preferably from 12 to 23%, based on the total iron calculated as $Fe_2O_3$. If the content of ferrous iron is less than 10%, the solar radiation transmittance tends to be high, such being undesirable. On the other hand, if it exceeds 30%, $SO_3$ used as a refining agent will be less remained in the melt and will lose the degassing effect, and due to formation of ferric sulfide, an amber color is likely to form. Further, evaporation of Se tends to be vigorous during melting, such being undesirable.

If FeO exceeds 0.21 part by weight, the thermal efficiency at the time of melting tends to be poor, and the glass melt is likely to freeze at the bottom of the furnace which is remote from the heating source. As an index for the thermal efficiency, an apparent thermal conductivity $\lambda$ may be employed. In order to avoid freezing of the glass melt, $\lambda$ is preferably maintained at a level of at least 5 kcal/m°ch at 1,500° C. and at least 0.01 kcal/m°ch at 1,000° C., more preferably at least 15 kcal/m°ch at 1,500° C. and at least 5 kcal/m°ch at 1,000° C. Preferably, FeO is within a range of from 0.07 to 0.20 part by weight.

If the content of $TiO_2$ is less than 0.05 part by weight, the ultraviolet ray transmittance tend to be too high, and if it exceeds 1.0 part by weight, $TiO_2$ tends to react with molten tin in the float bath, whereby the desired gray colored glass can not be obtained.

In an application where the requirement for the ultraviolet ray transmittance is not severe, the content of $TiO_2$ may be reduced. In such a case, the content of $TiO_2$ may be from 0.05 to 0.095 part by weight.

If the content of Se is less than 0.0005 part by weight, the color of glass tends to be blue, and if it exceeds 0.015 part by weight, it tends to be yellow. In either case, the desired gray colored glass can not be obtained.

If the content of CoO is less than 0.02 part by weight, the visible light transmittance tends to be too high, and if it exceeds 0.05 part by weight, the color of glass tends to be blue, whereby the desired gray colored glass can not be obtained.

The glass of this invention is suitable for a rear window glass of an automobile and is the one having the following optical properties. Namely, when the glass having the above composition has a thickness of from 3 to 5 mm, the visible light transmittance is at most 20%, preferably from 2 to 17%, the solar radiation transmittance is at most 30%, preferably from 10 to 30%, and the ultraviolet ray transmittance is at most 10%, preferably from 0.2 to 6%. In addition to the above optical properties, the glass preferably has a dominant wavelength of from 490 to 580 nm, preferably from 530 to 580 nm, for transmittance, and an excitation purity of from 2 to 10%.

The deep gray colored glass of the present invention can be prepared as follows.

The glass is melted by a conventional melting furnace, i.e. a melting furnace of a type wherein a fuel is burned above the batch layer so that the batch and cullet are heated by the flame and melted into the molten glass, and it is supplied to a usual float bath, whereby a glass ribbon having a predetermined thickness will be formed, to obtain a deep gray colored glass of the present invention.

Throughout the present specification, the solar radiation transmittance $T_e$ is the one determined in accordance with JIS R3106, and the ultraviolet ray transmittance $T_{uv}$ is the one determined in accordance with ISO 9050. The visible light transmittance was measured by using light source A, and the dominant wavelength and the excitation purity were measured by using light source C.

It is considered that in the present invention, the effects for lowering the visible light transmittance of the glass and lowering the solar radiation transmittance and the ultraviolet ray transmittance, can be obtained by incorporating coloring components such as $Fe_2O_3$, Se and CoO at high concentrations in the soda lime silicate glass.

Now, the present invention will be described in further detail with reference to Examples. However, it should be understood that the present invention is by no means restricted by such specific Examples.

EXAMPLE 1 to 10

Using silica sand, feldspar, dolomite, soda ash, Glauber's salt, ferric oxide, titanium oxide, cobalt oxide and selenium oxide, as raw materials, a batch prepared to obtain a glass of the composition as shown in Table 1, was melted in a conventional melting tank ($O_2$ concentration: about 2%), and the molten glass was supplied to a small size float test plant connected to the melting tank, to obtain a deep gray colored sheet glass.

In Table 1, $SiO_2$, $Al_2O_3$, CaO, MgO, $Na_2O$, $K_2O$ and $SO_3$ represent the matrix components (unit: wt %), and $Fe_2O_3$, $TiO_2$, Se and CoO represent coloring components (unit: parts by weight per 100 parts by weight of the total amount of the matrix components, except that with respect to Se and CoO, weight per $10^6$ parts by weight of the total amount of the matrix components).

With respect to the sheet glass thus obtained, the solar radiation transmittance $T_e$, the visible light transmittance $T_{va}$, the ultraviolet ray transmittance $T_{uv}$, the dominant wavelength $D_w$, the excitation purity $P_e$ (each of these values was calculated in a thickness of 5 mm) and the apparent thermal conductivity $\lambda$ (at 1,000° C., 1,500° C.) were obtained, and the results are shown in Table 1.

The apparent thermal conductivity can be measured as follows.

The glass is put in an elongated platinum crucible, and heated from above and cooled from below so that the glass temperature at the central position in the crucible will be 1,000° C. or 1,500° C. The temperature distribution in the depth direction is measured by a thermocouple. From the temperature distribution, an apparent thermal conductivity can be calculated by using a condition such that at each point in the depth direction a heat flux is maintained. Here, "apparent" is an expression to distinguish from a usual thermal conductivity including no radiation effect, since the calculated thermal conductivity is the one including the radiation effect.

On the other hand, the following melting test was carried out.

Namely, raw materials prepared to obtain a glass of the above composition were put in a platinum crucible and heated in an electric furnace under an atmosphere of about 2% oxygen content to obtain a molten glass. This melting was carried out under two conditions of 45 minutes and 60 minutes at 1,480° C. Then, the molten glass was cast on a framed carbon plate in the form of a sheet, followed by annealing. With respect to the obtained glass, the number of bubbles was counted, and the results are shown in Table 1.

TABLE 1

| Examples (symbol * represents Comparative Examples) | 1 | 2 | *3 | 4 | 5 | *6 | 7 | 8 | *9 | *10 |
| --- | --- | --- | --- | --- | --- | --- | --- | --- | --- | --- |
| Matrix components | | | | | | | | | | |
| $SiO_2$ (wt %) | 72.1 | 72.1 | 72.1 | 72.1 | 72.1 | 72.1 | 72.1 | 72.1 | 72.9 | 71.8 |
| $Al_2O_3$ (wt %) | 1.7 | 1.7 | 1.7 | 1.7 | 1.7 | 1.7 | 1.7 | 1.7 | 1.8 | 0.9 |
| $Na_2O$ (wt %) | 13.5 | 13.5 | 13.5 | 13.5 | 13.5 | 13.5 | 13.5 | 13.5 | 13.1 | 13.3 |
| $K_2O$ (wt %) | 0.5 | 0.5 | 0.5 | 0.5 | 0.5 | 0.5 | 0.5 | 0.5 | 0.7 | 0.2 |
| CaO (wt %) | 7.8 | 7.8 | 7.8 | 7.8 | 7.8 | 7.8 | 7.8 | 7.8 | 7.5 | 9.1 |
| MgO (wt %) | 4.1 | 4.1 | 4.1 | 4.1 | 4.1 | 4.1 | 4.1 | 4.1 | 3.9 | 4.4 |
| $SO_3$ (wt %) | 0.3 | 0.3 | 0.3 | 0.3 | 0.3 | 0.3 | 0.3 | 0.3 | 0.1 | 0.3 |
| Coloring components | | | | | | | | | | |
| t-$Fe_2O_3$ (parts to 100 parts by weight) | 0.82 | 1.38 | 1.3 | 1.2 | 1.0 | 1.25 | 1.28 | 1.05 | 0.82 | 1.38 |
| FeO (parts to 100 parts by weight) | 0.09 | 0.21 | 0.27 | 0.13 | 0.11 | 0.33 | 0.20 | 0.16 | 0.09 | 0.15 |
| $TiO_2$ (parts to 100 parts by weight) | 0.8 | 0.1 | 0.06 | 0.2 | 0.3 | 0.5 | 0.09 | 0.06 | — | — |
| Se (parts to $10^6$ parts) | 105 | 43 | 45 | 55 | 140 | 62 | 38 | 39 | 115 | 80 |
| CoO (parts to $10^6$ parts) | 283 | 235 | 270 | 282 | 481 | 301 | 262 | 207 | 285 | 228 |
| Ferrous iron/total iron | 12.2 | 16.9 | 23.1 | 12.0 | 12.1 | 29.3 | 17.4 | 17.0 | 12.2 | 12.1 |
| $T_e$ (%) | 23.5 | 17.1 | 13.8 | 21.2 | 11.5 | 10.9 | 13.2 | 19.5 | 24.2 | 19.3 |
| $T_{va}$ (%) | 9.0 | 16.6 | 14.5 | 13.0 | 2.7 | 11.2 | 9.5 | 15.3 | 8.2 | 12.2 |

TABLE 1-continued

| Examples (symbol * represents Comparative Examples) | 1 | 2 | *3 | 4 | 5 | *6 | 7 | 8 | *9 | *10 |
|---|---|---|---|---|---|---|---|---|---|---|
| $T_{uv}$ (%) | 3.2 | 2.5 | 3.9 | 3.9 | 5.5 | 0.4 | 1.0 | 1.6 | 10.0 | 3.5 |
| $D_v$ (nm) | 576 | 530 | 492 | 567 | 578 | 499 | 554 | 579 | 547 | 578 |
| $P_e$ (%) | 2.8 | 3.9 | 8.4 | 3.3 | 4.8 | 5.8 | 0.7 | 7.0 | 5.1 | 8.7 |
| Bubbles (number of bubbles/g) | | | | | | | | | | |
| Melting for 45 min. | 70 | 96 | 92 | 100 | 96 | 78 | 94 | 90 | 111 | 122 |
| Melting for 60 min. | 1.9 | 2.4 | 1.3 | 4.0 | 3.8 | 3.4 | 1.6 | 1.0 | 7.5 | 8.4 |
| $\lambda$(kcal/m°ch) at 1000° C. | 26 | 4 | 0.4 | 19 | 22 | 0.01 | 5 | 12 | 26 | 14 |
| $\lambda$(kcal/m°ch) at 1500° C. | 48 | 14 | 8 | 31 | 37 | 5 | 15 | 23 | 48 | 25 |

As described in the foregoing, the deep gray colored glass of the present invention has low visible light transmittance with the solar radiation transmittance and ultraviolet ray transmittance substantially reduced and is excellent in the melting property with little bubbles. Further, it can readily be melted by a conventional melting furnace and can be prepared by a float process which is excellent in the productivity.

We claim:

1. A deep gray colored glass comprising 100 parts by weight of matrix components and coloring components consisting essentially of: from 0.8 to 1.4 parts by weight of total iron calculated as $Fe_2O_3$, at most 0.21 part by weight of FeO, from 0.05 to 0.095 part by weight of $TiO_2$, from 0.0005 to 0.015 part by weight of Se and from 0.02 to 0.05 part by weight of CoO, wherein the deep gray colored glass has an excitation purity of 0.7–7%, and the matrix components comprise from 65 to 75 wt % of $SiO_2$, from 0.1 to 5.0 wt % of $Al_2O_3$, from 10 to 18 wt % of $Na_2O+K_2O$, from 5 to 15 wt % of CaO, from 1 to 6 wt % of MgO and from 0.05 to 1.0 wt % of $SO_3$.

2. The deep gray colored glass according to claim 1, wherein the amount of ferrous iron calculated as $Fe_2O_3$ in the total iron calculated as $Fe_2O_3$ is from 10 to 30%.

3. The deep gray colored glass according to claim 1, which has, in a thickness of 5 mm, a visible light transmittance (light source A) of at most 20%, a solar radiation transmittance of at most 30% and an ultraviolet ray transmittance of at most 10%.

4. The deep gray colored glass according to claim 1, which has, in a thickness of from 3 to 5 mm, a dominant wavelength of from 490 to 580 nm for transmittance, as measured by means of light source C and an excitation purity of from 2 to 7%.

5. The deep gray colored glass according to claim 1, which has an apparent thermal conductivity of at least 5 kcal/m°ch at 1,500° C. and at least 0.01 kcal/m°ch at 1,000° C.

6. The deep gray colored glass according to claim 1, which contains from 0.07 to 0.20 part by weight of FeO per 100 parts by weight of the matrix components.

7. The deep gray colored glass according to claim 6, wherein the content of ferrous iron calculated as $Fe_2O_3$ is from 12 to 23%, based on the total iron calculated as $Fe_2O_3$.

8. The deep gray colored glass according to claim 6, which has, in a thickness of 5 mm, a visible light transmittance (light source A) of from 2 to 17%, a solar radiation transmittance of from 10 to 30%, and an ultraviolet ray transmittance of from 0.2 to 6%.

9. The deep gray colored glass according to claim 6, which has an apparent thermal conductivity of at least 15 kcal/m°ch at 1,500° C. and at least 5 kcal/m°ch at 1,000° C.

* * * * *